United States Patent
Takesawa

(10) Patent No.: US 10,208,365 B2
(45) Date of Patent: Feb. 19, 2019

(54) CERMET TOOL

(71) Applicant: TUNGALOY CORPORATION, Iwaki-shi, Fukushima (JP)

(72) Inventor: Daisuke Takesawa, Iwaki (JP)

(73) Assignee: TUNGALOY CORPORATION, Iwaki-Shi, Fukushima (JP)

( * ) Notice: Subject to any disclaimer, the term of this patent is extended or adjusted under 35 U.S.C. 154(b) by 196 days.

(21) Appl. No.: 15/126,465

(22) PCT Filed: Mar. 19, 2015

(86) PCT No.: PCT/JP2015/058154
§ 371 (c)(1),
(2) Date: Sep. 15, 2016

(87) PCT Pub. No.: WO2015/141757
PCT Pub. Date: Sep. 24, 2015

(65) Prior Publication Data
US 2017/0088921 A1    Mar. 30, 2017

(30) Foreign Application Priority Data

Mar. 19, 2014 (JP) .................................. 2014-057041

(51) Int. Cl.
| | |
|---|---|
| C22C 29/04 | (2006.01) |
| C23C 30/00 | (2006.01) |
| B22F 3/16 | (2006.01) |
| B22F 9/04 | (2006.01) |
| B22F 5/00 | (2006.01) |

(52) U.S. Cl.
CPC ............ *C22C 29/04* (2013.01); *B22F 3/16* (2013.01); *B22F 9/04* (2013.01); *C23C 30/005* (2013.01); *B22F 2005/001* (2013.01); *B22F 2009/042* (2013.01); *B22F 2009/043* (2013.01); *B22F 2301/15* (2013.01); *B22F 2302/10* (2013.01); *B22F 2302/15* (2013.01); *B22F 2998/10* (2013.01); *B23B 2222/16* (2013.01); *B23B 2222/44* (2013.01)

(58) Field of Classification Search
CPC ...................................................... C22C 29/04
See application file for complete search history.

(56) References Cited

U.S. PATENT DOCUMENTS

| | | | | |
|---|---|---|---|---|
| 2008/0075543 A1* | 3/2008 | Zhu | ......................... | B23B 27/14 407/119 |
| 2008/0286608 A1* | 11/2008 | Quinto | .................. | C23C 30/005 428/698 |
| 2009/0049953 A1* | 2/2009 | Shindo | .................... | C22C 29/04 75/238 |
| 2010/0014930 A1 | 1/2010 | Taniuchi et al. | | |
| 2012/0114960 A1* | 5/2012 | Takesawa | ............... | C22C 1/051 428/565 |
| 2013/0036866 A1* | 2/2013 | Tamura | ................... | C22C 29/04 75/240 |
| 2016/0369380 A1* | 12/2016 | Kinoshita | ............. | C22C 29/005 |

FOREIGN PATENT DOCUMENTS

| | | |
|---|---|---|
| EP | 2 564 958 A1 | 3/2013 |
| JP | S-1988-63286550 A | 11/1988 |
| JP | 2005-194573 A | 9/2005 |
| JP | 2007-069311 A | 3/2007 |
| JP | 2010-222650 A | 10/2010 |
| JP | 2012-041595 A | 3/2012 |
| JP | 2013-010997 A | 1/2013 |
| RU | 89112 U1 | 11/2009 |
| RU | 2466828 C2 | 11/2012 |

OTHER PUBLICATIONS

European Search Report on corresponding Application No. 15764910.4 dated Oct. 23, 2017.
Russian Office Action and Search Report in corresponding application No. 2016140848/02 dated Oct. 23, 2017 with English translation.
International Search Report dated Jun. 16, 2015 issued in counterpart International (PCT) Application (No. PCT/JP2015/058154).
Written Opinion dated Jun. 16, 2015 issued in counterpart International (PCT) Application (No. PCT/JP2015/058154).

* cited by examiner

*Primary Examiner* — Megan McCulley
(74) *Attorney, Agent, or Firm* — Foley & Lardner LLP

(57) ABSTRACT

A cermet tool includes from 75-95 volume % of a hard phase and from 5-25 volume % of a binder phase. The hard phase has a first hard phase with a core portion of (Ti, Nb, Mo) (C, N) and a peripheral portion of (Ti, Nb, Mo, W) (C, N) or (Ti, Nb, Mo, W, Zr) (C, N), a second hard phase with both a core portion and a peripheral portion of (Ti, Nb, Mo, W) (C, N) or (Ti, Nb, Mo, W, Zr) (C, N), and a third hard phase of (Ti, Nb, Mo) (C, N). The ratio of Nbs/Nbi is from 0.8 to 1.2, where Nbs is a maximum Nb amount in a surface region and Nbi is an internal Nb amount in an internal region. The ratio of Ws/Wi is from 1.0 to 1.5, where Ws is a maximum W amount in the surface region and Wi is an internal W amount in the internal region. The area ratios A1, A2, and A3 of the respective hard phases are from 75 to 95 area % for A1, from 4 to 24 area % for A2, and from 1 to 24 area % for A3.

20 Claims, No Drawings

CERMET TOOL

RELATED APPLICATIONS

This is a 371 US National Phase of International Patent Application No. PCT/JP2015/058154 filed Mar. 19, 2015, and published as WO 2015/141757A1 on Sep. 24, 2015, which claims priority to JP 2014-057041, filed Mar. 19, 2014. The contents of the aforementioned applications are incorporated by reference in their entirety.

TECHNICAL FIELD

The present invention relates to a cermet tool.

BACKGROUND ART

Cermet tools are excellent in reaction resistance with iron and high-temperature strength compared with cemented carbide tools, and they are used for finishing process with taking advantage of the properties. For example, Patent Literature 1 describes a cermet tool having: a first hard phase with a core-rim structure composed of a core portion with a composite carbonitride phase of Ti, Nb, and Zr and a peripheral portion with a composite carbonitride phase of Ti, Nb, Zr and W or Ti, Nb, Zr, W and Ta; and a second hard phase with a core-rim structure composed of both a core portion and a peripheral portion with a composite carbonitride phase of Ti, Nb, Zr, and W or a composite carbonitride phase of Ti, Nb, Zr, W, and Ta.

PRIOR ART DOCUMENTS

Patent Document

Patent Literature 1: JP 2007-69311 A

DISCLOSURE OF THE INVENTION

Problems to be Solved by the Invention

However, in cutting process in recent years, higher speed, higher feed, and deeper cut became notable. In such high speed cutting conditions accompanied by heat generation at high temperatures, the tool life has tended to be reduced compared to conventional ones. That is, because strength between particles in the hard phases is insufficient, the conventional cermet tools have a problem of harshening roughness of a machined surface of a work piece material due to falling of hard phase particles in high speed cutting conditions accompanied by heat generation at high temperatures. They also have a problem of poor chipping resistance and fracture resistance while having excellent hardness of the hard phase.

The present invention has been made to solve the above problems. It is an object of the present invention to provide a cermet cutting tool that reduces machined surface roughness of a work piece material, has excellent fracture resistance and excellent chipping resistance without reducing wear resistance, and has long tool life.

Means to Solve the Problems

The present inventor conducted various examinations on cermet tools. As a result, the present inventor found that improvement in hard phase composition of a cermet tool enables fabrication of a cermet tool that has excellent fracture resistance and excellent chipping resistance without reducing wear resistance and reduces machined surface roughness of a work piece material to reach the present invention.

That is, the summary of the present invention is as follows.

(1) A cermet tool includes: not less than 75 volume % and not more than 95 volume % of a hard phase; and not less than 5 volume % and not more than 25 volume % of a binder phase, wherein
the hard phase is composed of
(a) a first hard phase with a core-rim structure composed of a core portion with a composite carbonitride phase of Ti, Nb, and Mo and a peripheral portion with a composite carbonitride phase of Ti, Nb, Mo, W, and Zr [hereinafter, referred to as (Ti, Nb, Mo, W, Zr) (C, N)] or a composite carbonitride phase of Ti, Nb, Mo, and W [hereinafter, referred to as (Ti, Nb, Mo, W) (C, N)],
(b) a second hard phase with a core-rim structure composed of both a core portion and a peripheral portion with the (Ti, Nb, Mo, W, Zr) (C, N) phase or the (Ti, Nb, Mo, W) (C, N) phase, and
(c) a third hard phase composed of a composite carbonitride phase of Ti, Nb, and Mo,
the binder phase is composed of an element having at least one selected from the group consisting of Co, Ni, and Fe as a main component,
when a maximum content of a concentration of the Nb element in a surface region that is within a range from a surface of the cermet tool to a depth of 300 μm is Nbs and an internal content of a concentration of the Nb element in an internal region that is deeper inside from the surface region is Nbi, Nbs/Nbi is not less than 0.8 and not more than 1.2,
when a maximum content of a concentration of the W element in the surface region is Ws and an internal content of a concentration of the W element in the internal region is Wi, Ws/Wi is not less than 1.0 and not more than 1.5, and,
in a cross section of the internal region of the cermet tool, when an area ratio of the first hard phase is A1, an area ratio of the second hard phase is A2, an area ratio of the third hard phase is A3, and an area of the entire hard phase is 100 area %, the A1 is not less than 75 area % and not more than 95 area %, the A2 is not less than 4 area % and not more than 24 area %, and the A3 is not less than 1 area % and not more than 24 area %.

(2) The cermet tool of (1), wherein, when Vickers hardness in the surface region is Hs and Vickers hardness in the internal region is Hi, Hs/Hi is not less than 1.1 and not more than 1.3.

(3) The cermet tool of (1) or (2), wherein, when an area ratio of the core portion in the first hard phase in the surface region is C1s and an area ratio of the core portion in the first hard phase in the internal region is C1i, C1s/C1i is not less than 0.3 and not more than 0.9.

(4) The cermet tool of any one of (1) to (3), wherein, when an average particle size of the hard phase in the surface region is ds and an average particle size of the hard phase in the internal region is di, ds/di is not less than 1.0 and not more than 2.0.

(5) The cermet tool of any one of (1) to (4), wherein an average particle size of the hard phase is not less than 1.0 μm and not more than 3.0 μm.

(6) The cermet tool of any one of (1) to (5), wherein a part of Nb contained in the hard phase is substituted by Ta.

(7) A coated cermet tool includes: the cermet tool according to any one of (1) to (6); and a coating layer formed on a surface of the cermet tool.

<Cermet Tool>

Specific examples of type of a cermet tool of the present invention include indexable inserts for milling, or turning, drills, and end mills.

The cermet tool of the present invention is a cermet tool including a hard phase and a binder phase having at least one selected from the group consisting of Co, Ni, and Fe as a main component. The proportion of the hard phase to the entire cermet tool (100 volume %) is from 75 to 95 volume % and the binder phase occupies the rest.

When the proportion of the hard phase is less than 75 volume % in the cermet tool of the present invention, the wear resistance of the cermet tool is reduced. When the proportion of the hard phase is over 95 volume % in the cermet tool of the present invention, the fracture resistance of the cermet tool is reduced and the residual amount for the binder phase is also reduced relatively, so that sinterability of raw materials is reduced during production of the cermet tool. Therefore, the proportion of the hard phase is determined from 75 to 95 volume % and the proportion of the binder phase as the rest. From the above perspective, it is even more preferred that the proportion of the hard phase is from 80 to 90 volume % and the proportion of the binder phase takes the rest.

The proportions of the hard phase and the binder phase in the cermet tool of the present invention are obtained as follows. A cross-section from a surface of the cermet tool to 500 μm inside in a depth direction is observed with a scanning electron microscope (SEM) with an energy dispersive X-ray spectrometer (EDS), and the cross-section is chemically etched using aqua regia to observe the chemically etched cross-section with a SEM with an EDS. Then, from these two types of cross-section, an area ratio of the hard phase that is not chemically etched and an area ratio of the hard phase that is chemically etched are measured. From the measured results, proportions of volume % of the hard phase and volume % of the binder phase in the cermet tool are obtained.

The binder phase of the cermet tool of the present invention is metal having at least one selected from Co, Ni, and Fe as a main component. The metal having at least one selected from Co, Ni, and Fe as a main component means metal in which total mass of metal at least one selected from Co, Ni, and Fe in the binder phase is 50 mass % or more based on the total mass of the binder phase. In the binder phase of the present invention, other than Co, Ni, and Fe, hard phase components may be contained. Generally, the total content of the hard phase component contained in the binder phase of the present invention is 20 mass % or less based on the total mass of the binder phase. In particular, it is more preferred that the binder phase of the cermet tool of the present invention is metal having one or two of Co and Ni as main components. In such a case, it is possible to obtain a cermet tool that is excellent in wettability between the binder phase and the hard phase, heat resistance, and corrosion resistance.

The hard phase of the cermet tool of the present invention has a first hard phase with a core-rim structure composed of a core portion with a composite carbonitride phase of Ti, Nb, and Mo [hereinafter, referred to as (Ti, Nb, Mo) (C, N)] and a peripheral portion with a composite carbonitride phase of Ti, Nb, Mo, W, and Zr [hereinafter, referred to as (Ti, Nb, Mo, W, Zr) (C, N)] or a composite carbonitride phase of Ti, Nb, Mo, and W [hereinafter, referred to as (Ti, Nb, Mo, W) (C, N)]. The core portion and the peripheral portion have different composition. Since Nb is excellent in high-temperature hardness and oxidation resistance, wear by reaction is inhibited in high speed process and thus the cermet tool has excellent wear resistance. Mo is excellent in wettability with the binder phase during sintering and also excellent in wettability between the hard phases. The strength of the cermet tool is therefore improved by containing Mo in the first hard phase, and thus the fracture resistance and chipping resistance are improved. Further, W is excellent in hardness. The cermet tool therefore has excellent wear resistance by containing W in the first hard phase. In addition, Zr in the hard phase is excellent in high-temperature strength, so that the cermet tool has excellent plastic deformation resistance by containing Zr in the first hard phase.

The hard phase of the cermet tool of the present invention has a second hard phase with a core-rim structure composed of both a core portion and a peripheral portion with a (Ti, Nb, Mo, W, Zr) (C, N) phase or a (Ti, Nb, Mo, W) (C, N) phase. W is excellent in hardness. The cermet tool is therefore excellent in wear resistance by containing W in the second hard phase. In addition, Zr in the hard phase is excellent in high-temperature strength, so that the cermet tool has excellent plastic deformation resistance by containing Zr in the second hard phase.

The hard phase of the cermet tool of the present invention has a third hard phase with a single phase particle structure composed of a composite carbonitride phase of Ti, Nb, and Mo [hereinafter, referred to as (Ti, Nb, Mo) (C, N)]. The third hard phase is excellent in thermal shock resistance due to high thermal conductivity, so that it is possible to inhibit generation of thermal cracks. By having the third hard phase dispersed in the cermet tool, the fracture resistance is therefore improved.

In particular, the cermet tool of the present invention contains Nb and Mo in all the hard phase of the first hard phase, the second hard phase, and the third hard phase, so that the tool is excellent in wear resistance at high temperatures and also excellent in fracture resistance. In addition, Ta is excellent in high-temperature hardness similar to Nb. Therefore, the cermet tool of the present invention is also preferred to substitute Ta for a part of Nb contained in the hard phase within at least one hard phase of the hard phases constituting the first hard phase, the second hard phase, and the third hard phase.

In the cermet tool of the present invention, when a maximum content of a concentration of the Nb element in a surface region that is within a range from a surface of the cermet tool to a depth of 300 μm is Nbs and an internal content of a concentration of the Nb element in an internal region that is deeper inside from the surface region is Nbi, Nbs/Nbi is not less than 0.8 and not more than 1.2. When Nbs/Nbi falls within this range, the concentration of the Nb element is approximately uniform in the surface region and the internal region of the cermet tool, so that the cermet tool has excellent high-temperature strength. When Nbs/Nbi is less than 0.8, the wear resistance of the cermet tool is reduced. When Nbs/Nbi is over 1.2, the fracture resistance of the cermet tool is reduced.

In the cermet tool of the present invention, when a maximum content of a concentration of the W element in a surface region that is within a range from a surface of the cermet tool to a depth of 300 μm is Ws and an internal content of a concentration of the W element in an internal region that is deeper inside from the surface region is Wi, Ws/Wi is not less than 1.0 and not more than 1.5. When Ws/Wi falls within this range, hardness in the surface region of the cermet tool is excellent and toughness in the internal region is excellent, and thus the wear resistance, the chipping resistance, and the fracture resistance of the cermet tool are improved. When Ws/Wi is less than 1.0, the wear resistance of the cermet tool is reduced. When Ws/Wi is over 1.5, the chipping resistance and the fracture resistance of the cermet tool are reduced.

In the cermet tool of the present invention, by having a uniform concentration of the Nb element in the surface region and the internal region, and increasing the concentration of the W element in the surface region, cutting performances, such as wear resistance, chipping resistance, and fracture resistance, are improved. That is, Nb with excellent in high-temperature hardness contributes to the cutting performances in high speed cutting conditions accompanied by heat generation at high temperatures, whereas W contributes to the cutting performances in conventional cutting conditions. It is, therefore, possible to process without reducing the cutting performances in all process conditions.

In the cermet tool of the present invention, in a cross section of the internal region that is deeper inside from the surface region that is within a range from a surface of the cermet tool to a depth of 300 µm, when an area ratio of the first hard phase is A1, an area ratio of the second hard phase is A2, an area ratio of the third hard phase is A3, and an area of the entire hard phase is 100 area %, the A1 is not less than 75 area % and not more than 95 area %, the A2 is not less than 4 area % and not more than 24 area %, and the A3 is not less than 1 area % and not more than 24 area %. When A1 is less than 75 area %, toughness is insufficient and thus the fracture resistance of the cermet tool is reduced. When A1 is over 95 area %, the area of A2 or A3 is relatively reduced and thus the hardness or thermal conductivity is reduced, so that the wear resistance or the thermal shock resistance of the cermet tool is reduced. When A2 is less than 4 area %, hardness is insufficient and thus the wear resistance of the cermet tool is reduced. When A2 is over 24 area %, the area of A1 or A3 is relatively reduced and thus the toughness and the thermal conductivity are reduced, so that the fracture resistance or the thermal shock resistance of the cermet tool is reduced. When A3 is less than 1 area %, thermal conductivity is insufficient and thus the thermal shock resistance of the cermet tool is reduced. When A3 is over 24 area %, the area of A1 or A2 is relatively reduced and thus the toughness is reduced, so that the fracture resistance of the cermet tool is reduced.

In the cermet tool of the present invention, when Vickers hardness in the surface region that is within a range from a surface of the cermet tool to a depth of 300 µm is Hs and Vickers hardness in the internal region that is deeper inside from the surface region is Hi, Hs/Hi is preferably not less than 1.1 and not more than 1.3. When Hs/Hi of the cermet tool of the present invention is less than 1.1, the wear resistance tends to be reduced. When Hs/Hi is over 1.3, the chipping resistance and the fracture resistance tend to be reduced.

In the cermet tool of the present invention, when an area ratio of the core portion in the first hard phase in the surface region that is within a range from a surface of the cermet tool to a depth of 300 µm is C1s and an area ratio of the core portion in the first hard phase in the internal region that is deeper inside from the surface region is C1i, C1s/C1i is preferably not less than 0.3 and not more than 0.9. When C1s/C1i of the cermet tool of the present invention is less than 0.3, the fracture resistance tends to be reduced. When C1s/C1i is over 0.9, the wear resistance tends to be reduced.

In the cermet tool of the present invention, when an average particle size of the hard phase in the surface region that is within a range from a surface of the cermet tool to a depth of 300 µm is ds and an average particle size of the hard phase in the internal region that is deeper inside from the surface region is di, ds/di is preferably not less than 1.1 and not more than 2.0. When ds/di of the cermet tool of the present invention is less than 1.1, the fracture resistance tends to be reduced. When ds/di is over 2.0, the wear resistance tends to be reduced.

In the cermet tool of the present invention, an average particle size of the hard phase is preferably not less than 1.0 µm and not more than 3.0 µm. When the average particle size of the hard phase in the cermet tool of the present invention is less than 1.0 µm, the fracture resistance tends to be reduced. When the size is over 3.0 µm, the hardness is reduced and the wear resistance tends to be reduced.

The concentration of the Nb element and the concentration of the W element in the cermet tool of the present invention are obtained as follows. The cermet tool is polished by tilting at 10 degrees relative to the surface of the cermet tool and the cross-section of the polished surface is observed with an SEM, and the concentration is obtained by using the EDS attached to the SEM. Concentrations in 10 spots with intervals of 10 µm in a vertical direction from the surface of the cermet tool are measured and the maximum contents among them are defined as Nbs and Ws, and arbitrary concentrations in 10 spots in positions of 500 µm from the surface are measured and the average values are defined as Nbi and Wi.

Vickers hardness Hs in the surface region of the cermet tool of the present invention and Vickers hardness Hi in the internal region are obtained as follows. In order to measure hardness from the surface to inside of the cermet tool, the cermet tool is polished by tilting at 10 degrees relative to the surface of the cermet tool to measure Vickers hardness at an applied load of 4.9 N using a micro-Vickers hardness tester with intervals of 10 µm in the vertical direction from the surface of the cermet tool. The maximum hardness in a range within 300 µm from the surface of the cermet tool is defined as Hs, and Vickers hardness in 5 spots in positions of 500 µm from the surface of the cermet tool are measured and the maximum hardness among the 5 spots is defined as Hi.

The average particle size ds in the surface region and the average particle size di in the internal region of the hard phase of the cermet tool of the present invention are obtained as follows. The cermet tool is polished by tilting at 10 degrees relative to the surface of the cermet tool. The sizes are obtained from an image of the cross-section of the polished surface enlarged at a magnification from 2000 to 10000 with an SEM using Fullman's expression (1).

$$dm = (4/\pi) \cdot (NL/NS) \qquad (1)$$

(In the equation, dm denotes an average particle size, $\pi$ denotes the circular constant, NL denotes the number of hard phases per unit length hit by an arbitrary straight line on the cross-section, and NS denotes the number of hard phases contained in an arbitrary unit area.)

The average particle size of the hard phase is a value obtained by averaging the average particle size ds in the surface region and the average particle size di in the internal region.

The area ratios A1, A2, and A3 of the respective hard phases in the internal region of the cermet tool of the present invention are obtained from an SEM image of the cross-section by a method using commercially available image analysis software or the method using Fullman's expression.

A specific measurement method when Fullman's expression is used is described below. The cermet tool is polished and the ratio is obtained from an image of the cross-section of the polished surface in the internal region of the cermet tool enlarged at a magnification from 2000 to 10000 with an SEM using the Fullman's expression (1). Using the Fullman's expression (1) described above, the respective average particle sizes of the first hard phase, the second hard phase, and the third hard phase are obtained. Using the average particle size of each hard phase and the number of each hard phase contained in the unit area, the area of each hard phase contained in the unit area is obtained and the area ratios A1, A2, and A3 of the respective hard phases are determined.

The area ratio C1s of the core portion in the first hard phase in the surface region of the cermet tool of the present invention and the area ratio C1i of the core portion in the first hard phase in the internal region are obtained as follows. The cermet tool is polished by tilting at 10 degrees relative to the surface of the cermet tool. A photograph of the polished sectional surface is taken by enlarging at a magnification from 2000 to 10000 with an SEM. C1s and C1i are calculated from the photograph using commercially available image analysis software.

Effects of the Invention

The cermet tool of the present invention enables reduction of machined surface roughness of a work piece material. In addition, the cermet tool of the present invention has excellent fracture resistance and excellent chipping resistance without reducing wear resistance, so that the tool exhibits the effect of extending tool life more than conventional ones.

EXAMPLES

Subsequently, a method of manufacturing a cermet tool of the present invention is described using specific examples. The method of manufacturing a cermet tool of the present invention is not limited in particular as long as the structure (the hard phase and the binder phase) of the cermet tool is achieved.

For example, a method of manufacturing a cermet tool of the present invention includes:

step (A): a step of blending 30 to 90 mass % of titanium niobium molybdenum carbonitride powder or titanium niobium tantalum molybdenum carbonitride powder having an average particle size of 0.5 to 4.0 μm, 5 to 40 mass % of at least one type of powder, having an average particle size of 0.5 to 4.0 μm, selected from the group consisting of a carbide, a nitride, and a carbonitride of at least one metal element selected from the group consisting of Ti, Zr, Nb, Mo, and W except titanium niobium molybdenum carbonitride and titanium niobium tantalum molybdenum carbonitride powder, and 5 to 30 mass % of at least one type of powder selected from the group consisting of Co, Ni, and Fe having an average particle size of 0.5 to 3.0 μm (note that they are 100 mass % in total);

step (B): a mixing step of blending the raw material powder and mixing in a wet ball mill in 5 to 35 hours to prepare a mixture;

step (C): a pressing step of obtaining a pressed body by pressing the mixture to form a predetermined shape of a tool;

step (D): a first temperature-increasing step of increasing temperature of the pressed body obtained in the step (C) to a predetermined temperature within a range between 1200 and 1400° C. in vacuum at 67 Pa or less;

step (E): a second temperature-increasing step of increasing temperature of the pressed body after the step (D) to a sintering temperature within a range between 1400 and 1600° C., from the predetermined temperature within a range between 1200 and 1400° C., (the sintering temperature is higher than the predetermined temperature) in a nitrogen atmosphere from 50 to 1330 Pa;

step (F): a first sintering step of maintaining the pressed body after the step (E) at a sintering temperature within the range between 1400 and 1600° C. in a nitrogen atmosphere at the pressure same as the pressure in the step (E) for a predetermined period of time for sintering;

step (G): a first cooling step of cooling the pressed body after the step (F) to a temperature within a range between 1000 and 1200° C. at a rate of 1 to 50° C./min from the range between 1400 and 1600° C. in a nitrogen pressure from 1 to 50 Pa that is lower than the pressure in the step (F);

step (H): a second sintering step of maintaining the pressed body after the step (G) at a sintering temperature within a range between 1000 and 1200° C. in a nitrogen atmosphere at the pressure same as the pressure in the step (G) for a predetermined period of time for sintering; and step (I): a second cooling step of cooling the pressed body after the step (H) from the predetermined temperature within the range between 1000 and 1200° C. to normal temperature.

The raw material powder used in the step (A) has an average particle size measured by Fisher method (Fisher Sub-Sieve Sizer (FSSS)) in accordance with American Society for Testing Materials (ASTM) standard B330.

Each step of the method of manufacturing a cermet tool of the present invention has the following significance.

In the step (A), the use of titanium niobium molybdenum carbonitride powder or titanium niobium tantalum molybdenum carbonitride powder and at least one type of powder selected from the group consisting of a carbide, a nitride, and a carbonitride of at least one metal element selected from the group consisting of Ti, Zr, Nb, Mo, and W enables constitution of the first hard phase, the second hard phase, and the third hard phase.

In the step (B), it is possible to adjust the average particle size of the hard phase and uniformly mix the mixed powder with predetermined composition. This is pressed, sintered, and cooled in the following steps to obtain the cermet tool of the present invention having a hard phase and a binder phase with specific composition.

In the step (C), the mixture thus obtained is pressed to form a predetermined shape of a tool. The pressed body thus obtained is sintered in the following sintering step.

In the step (D), the temperature of the pressed body is increased in vacuum at 67 Pa or less to accelerate degasification before appearance of a liquid phase and immediately after appearance of a liquid phase, and thus the sinterability in the following sintering step is improved.

In the step (E), sintering at a temperature within a range between 1400 and 1600° C. enables an increase in the concentration of the W element in the surface region of the cermet tool. In addition, in the steps (E) and (F), the process is performed in the nitrogen atmosphere to prevent denitrification from the surfaces of the pressed body. Therefore, reduction of smoothness on the as-sintered surface accompanied by denitrification and reduction in the hard phase, such as (Ti, Nb, Mo) (C, N), near the as-sintered surface are inhibited.

In the step (G), cooling at a nitrogen pressure of 1 to 50 Pa that is lower than the steps (E) and (F) and at a cooling rate from 1 to 50° C./min enables inhibition of movement of Nb elements to the surfaces of the pressed body.

In the step (H), by holding at a temperature lower than that in the step (F), the area ratios of the first to third hard phases become arbitrary.

Then, in the step (I), the sintered body is cooled to room temperature to obtain the cermet tool of the present invention.

The cermet tool obtained through the steps from (A) to (I) may be subjected to grinding and honing on the edge, as needed.

Example 1

[Production of Cermet Tool]

As raw material powders that were commercially available, (Ti, Nb, Mo) (C, N) powder having an average particle size of 2.0 μm (mass ratio of TiC/TiN=50/50), (Ti, Nb, Ta, Mo) (C, N) powder having an average particle size of 2.0 μm (mass ratio of TiC/TiN=50/50), WC powder having an average particle size of 1.5 μm, ZrC powder having an average particle size of 1.5 μm, Co powder having an average particle size of 1.0 μm, and Ni powder having an average particle size of 1.0 μm were prepared. The average particle sizes of the raw material powders were measured by Fisher method (Fisher Sub-Sieve Sizer (FSSS)) in accordance with American Society for Testing Materials (ASTM) standard B330. The expression (Ti, Nb, Mo) (C, N) means composite carbonitride of Ti, Nb, and Mo and (Ti, Nb, Ta, Mo) (C, N) means composite carbonitride of Ti, Nb, Ta, and Mo.

The prepared raw material powders were weighed to be at the blending composition in Table 1 below, and the weighed raw material powders were put in a stainless steel pot together with an acetone solvent and cemented carbide balls for mixing and grinding in the wet ball mill Time periods for mixing and grinding in the wet ball mill are shown in Table 2. After the mixing and grinding in the wet ball mill, the mixture obtained by evaporating the acetone solvent was pressed at a pressure of 196 MPa in a mold to be, after sintering, a shape of an insert shape of SDKN1203 with a breaker in JIS B 4120, and a pressed body of the mixture was obtained.

TABLE 1

| Sample No. | Composition (mass %) |
|---|---|
| Present Product 1 | 60% (Ti$_{0.80}$Nb$_{0.10}$Mo$_{0.10}$) (C$_{0.5}$N$_{0.5}$), 21% WC, 1% ZrC, 9% Co, 9% Ni |
| Present Product 2 | 70% (Ti$_{0.80}$Nb$_{0.10}$Mo$_{0.10}$) (C$_{0.5}$N$_{0.5}$), 11% WC, 1% ZrC, 9% Co, 9% Ni |
| Present Product 3 | 50% (Ti$_{0.80}$Nb$_{0.10}$Mo$_{0.10}$) (C$_{0.5}$N$_{0.5}$), 33% WC, 1% ZrC, 8% Co, 8% Ni |
| Present Product 4 | 60% (Ti$_{0.70}$Nb$_{0.20}$Mo$_{0.10}$) (C$_{0.5}$N$_{0.5}$), 21% WC, 1% ZrC, 9% Co, 9% Ni |
| Present Product 5 | 60% (Ti$_{0.90}$Nb$_{0.08}$Mo$_{0.02}$) (C$_{0.5}$N$_{0.5}$), 21% WC, 1% ZrC, 9% Co, 9% Ni |
| Present Product 6 | 65% (Ti$_{0.80}$Nb$_{0.10}$Mo$_{0.10}$) (C$_{0.5}$N$_{0.5}$), 22% WC, 1% ZrC, 6% Co, 6% Ni |
| Present Product 7 | 53% (Ti$_{0.80}$Nb$_{0.10}$Mo$_{0.10}$) (C$_{0.5}$N$_{0.5}$), 22% WC, 1% ZrC, 12% Co, 12% Ni |
| Present Product 8 | 60% (Ti$_{0.80}$Nb$_{0.10}$Mo$_{0.10}$) (C$_{0.5}$N$_{0.5}$), 22% WC, 1% ZrC, 12% Co, 5% Ni |
| Present Product 9 | 60% (Ti$_{0.80}$Nb$_{0.10}$Mo$_{0.10}$) (C$_{0.5}$N$_{0.5}$), 22% WC, 1% ZrC, 5% Co, 12% Ni |
| Present Product 10 | 60%(Ti$_{0.70}$Nb$_{0.10}$Ta$_{0.10}$Mo$_{0.10}$) (C$_{0.5}$N$_{0.5}$), 20% WC, 1% ZrC, 10% Co, 9% Ni |
| Comparative Product 1 | 60% (Ti$_{0.80}$0Nb$_{0.10}$Mo$_{0.10}$) (C$_{0.5}$N$_{0.5}$), 21% WC, 1% ZrC, 9% Co, 9% Ni |
| Comparative Product 2 | 60% (Ti$_{0.80}$Nb$_{0.10}$Mo$_{0.10}$) (C$_{0.5}$N$_{0.5}$), 21% WC, 1% ZrC, 9% Co, 9% Ni |

TABLE 1-continued

| Sample No. | Composition (mass %) |
|---|---|
| Comparative Product 3 | 50%Ti(C$_{0.5}$N$_{0.5}$), 22% WC, 8%NbC, 1%Mo, 2%C, 1% ZrC, 9% Co, 9% Ni |
| Comparative Product 4 | 60% (Ti$_{0.80}$Nb$_{0.10}$Mo$_{0.10}$) (C$_{0.5}$N$_{0.5}$), 21% WC, 1% ZrC, 9% Co, 9% Ni |
| Comparative Product 5 | 60% (Ti$_{0.80}$Nb$_{0.10}$Mo$_{0.10}$) (C$_{0.5}$N$_{0.5}$), 21% WC, 1% ZrC, 9% Co, 9% Ni |
| Comparative Product 6 | 60% (Ti$_{0.80}$Nb$_{0.10}$Mo$_{0.10}$) (C$_{0.5}$N$_{0.5}$), 21% WC, 1% ZrC, 9% Co, 9% Ni |

TABLE 2

| Sample No. | Time Period In Wet Ball Mill (hours) |
|---|---|
| Present Product 1 | 13 |
| Present Product 2 | 12 |
| Present Product 3 | 15 |
| Present Product 4 | 13 |
| Present Product 5 | 13 |
| Present Product 6 | 12 |
| Present Product 7 | 15 |
| Present Product 8 | 13 |
| Present Product 9 | 14 |
| Present Product 10 | 14 |
| Comparative Product 1 | 13 |
| Comparative Product 2 | 30 |
| Comparative Product 3 | 15 |
| Comparative Product 4 | 13 |
| Comparative Product 5 | 14 |
| Comparative Product 6 | 13 |

After the pressed body of the mixture was put in a sintering furnace, the temperature was increased to a nitrogen introduction temperature T1 (° C.) shown in Table 3(a) from room temperature in vacuum at 67 Pa or less. When the temperature in the furnace reached the nitrogen introduction temperature T1 (° C.), nitrogen gas was introduced into the sintering furnace until a pressure in the furnace reached a furnace pressure P1 (Pa) shown in Table 3(b). In the nitrogen atmosphere at the furnace pressure P1 (Pa), the temperature was increased from the nitrogen introduction temperature T1 (° C.) to the sintering temperature T2 (° C.) shown in Table 3(c). When the temperature in the furnace reached the sintering temperature T2 (° C.), the sintering temperature T2 (° C.) was maintained in the nitrogen atmosphere at the furnace pressure P1 (Pa) for 60 min for sintering. Then, the nitrogen gas was discharged until the furnace pressure P1 (Pa) reached a furnace pressure P2 (Pa) shown in Table 3(d), and then it was cooled from the sintering temperature T2 (° C.) to a sintering temperature T3 (° C.) shown in Table 3(f) with a cooling rate R1 (° C./min) When the temperature in the furnace reached the sintering temperature T3 (° C.), the sintering temperature T3 (° C.) was maintained in the nitrogen atmosphere at the furnace pressure P2 (Pa) for 60 min for sintering. Then, the nitrogen was discharged and replaced by an argon atmosphere. The argon atmosphere was cooled from the sintering temperature T3 (° C.) to room temperature.

TABLE 3

| Sample No. | (a) Nitrogen Introduction Temperature T1 (° C.) | (b) Pressure in Furnace P1 (Pa) | (c) Sintering Temperature T2 (° C.) | (d) Pressure in Furnace P2 (Pa) | (e) Cooling Rate R1 (° C./min) | (f) Sintering Temperature T3 (° C.) |
|---|---|---|---|---|---|---|
| Present Product 1 | 1350 | 200 | 1550 | 30 | 10 | 1150 |
| Present Product 2 | 1300 | 200 | 1500 | 30 | 10 | 1100 |
| Present Product 3 | 1400 | 200 | 1600 | 30 | 10 | 1200 |
| Present Product 4 | 1350 | 200 | 1550 | 30 | 10 | 1150 |
| Present Product 5 | 1350 | 200 | 1550 | 30 | 50 | 1150 |
| Present Product 6 | 1350 | 200 | 1550 | 30 | 5 | 1150 |
| Present Product 7 | 1350 | 200 | 1550 | 5 | 10 | 1150 |
| Present Product 8 | 1350 | 500 | 1550 | 30 | 10 | 1150 |
| Present Product 9 | 1350 | 200 | 1550 | 50 | 10 | 1150 |
| Present Product 10 | 1380 | 200 | 1550 | 40 | 10 | 1170 |
| Comparative Product 1 | 1400 | 200 | 1650 | 30 | 10 | 1250 |
| Comparative Product 2 | 1250 | 200 | 1380 | 30 | 10 | 1150 |
| Comparative Product 3 | 1350 | 200 | 1550 | 30 | 10 | 1150 |
| Comparative Product 4 | 1400 | 200 | 1650 | 100 | 10 | 1150 |
| Comparative Product 5 | 1400 | 200 | 1650 | 1 | 100 | 1250 |
| Comparative Product 6 | 1350 | 200 | 1550 | — | — | — |

The cermet tool obtained by sintering was subjected to honing at the edge of the cermet tool by a wet brush honing machine.

The cermet tools of Present Products and Comparative Products thus prepared were polished by tilting at 10 degrees relative to surfaces of the cermet tools. Cross-sections of the polished surfaces were observed with an SEM to measure each composition of Nbs and Ws in the surface region and Nbi and Wi in the internal region, respectively, using the EDS attached to the SEM. From the compositions thus measured, Nbs/Nbi and Ws/Wi were obtained. The results are shown in Table 4.

TABLE 4

| Sample No. | Nbs/Nbi | Ws/Wi |
|---|---|---|
| Present Product 1 | 0.9 | 1.1 |
| Present Product 2 | 1.0 | 1.0 |
| Present Product 3 | 0.8 | 1.4 |
| Present Product 4 | 0.9 | 1.1 |
| Present Product 5 | 0.9 | 1.0 |
| Present Product 6 | 1.0 | 1.1 |
| Present Product 7 | 1.1 | 1.1 |
| Present Product 8 | 1.1 | 1.5 |
| Present Product 9 | 1.0 | 1.0 |
| Present Product 10 | 1.0 | 1.1 |
| Comparative Product 1 | 1.1 | 1.4 |
| Comparative Product 2 | 1.1 | 0.9 |
| Comparative Product 3 | 1.5 | 1.5 |
| Comparative Product 4 | 1.1 | 1.3 |
| Comparative Product 5 | 0.9 | 1.6 |
| Comparative Product 6 | 1.4 | 1.3 |

For the polished surface polished by tilting at 10 degrees relative to a surface of the cermet tool, an image of a cross-section of the polished surface enlarged at a magnification of 5000 with an SEM was taken. From the image thus taken, the average particle size ds in the surface region of the hard phase and the average particle size di in the internal region were measured using Fullman's expression (1) and ds/di was obtained. The average particle size of the hard phase was defined as an average value of the average particle size ds in the surface region and the average particle size di in the internal region. The ds/di and the average particle size of the hard phase are shown in Table 5. Further, from the image thus taken, the area ratio C1s of the core portion in the first hard phase in the surface region and the area ratio C1i of the core portion in the first hard phase in the internal region were measured using Fullman's expression (1). C1s/C1i was obtained from C1s and C1i that were measured. The results are shown in Table 5.

TABLE 5

| Sample No. | ds/di | Average Particle Size of Hard Phase (μm) | C1s/C1i |
|---|---|---|---|
| Present Product 1 | 1.3 | 1.5 | 0.8 |
| Present Product 2 | 1.1 | 1.2 | 0.9 |
| Present Product 3 | 1.6 | 1.8 | 0.5 |
| Present Product 4 | 1.3 | 1.4 | 0.8 |
| Present Product 5 | 1.4 | 1.6 | 0.7 |
| Present Product 6 | 1.7 | 1.7 | 0.8 |
| Present Product 7 | 1.2 | 1.3 | 0.7 |
| Present Product 8 | 1.5 | 1.7 | 0.3 |
| Present Product 9 | 1.0 | 1.3 | 0.9 |
| Present Product 10 | 1.3 | 1.6 | 0.7 |
| Comparative Product 1 | 1.8 | 3.2 | 0.5 |
| Comparative Product 2 | 1.7 | 0.9 | 0.7 |

TABLE 5-continued

| Sample No. | ds/di | Average Particle Size of Hard Phase (μm) | C1s/C1i |
|---|---|---|---|
| Comparative Product 3 | 2.1 | 1.4 | 0.4 |
| Comparative Product 4 | 1.0 | 1.2 | 1.0 |
| Comparative Product 5 | 2.2 | 2.2 | 0.5 |
| Comparative Product 6 | 2.5 | 1.8 | 1.1 |

For the polished surface polished by tilting at 10 degrees relative to the surface of the cermet tool, Vickers hardness at an applied load of 4.9 N was measured using a micro-Vickers hardness tester with intervals of 10 μm in a vertical direction from the surface of the cermet tool. The maximum hardness within a range within 300 μm from the surface of the cermet tool was defined as Hs. Vickers hardness in 5 spots in positions of 500 μm from the surface of the cermet tool was measured and the maximum hardness in the 5 spots was defined as Hi. The results are shown in Table 6.

TABLE 6

| Sample No. | Hs/Hi |
|---|---|
| Present Product 1 | 1.1 |
| Present Product 2 | 1.1 |
| Present Product 3 | 1.3 |
| Present Product 4 | 1.1 |
| Present Product 5 | 1.1 |
| Present Product 6 | 1.3 |
| Present Product 7 | 1.1 |
| Present Product 8 | 1.3 |
| Present Product 9 | 1.1 |

TABLE 6-continued

| Sample No. | Hs/Hi |
|---|---|
| Present Product 10 | 1.1 |
| Comparative Product 1 | 1.4 |
| Comparative Product 2 | 1.0 |
| Comparative Product 3 | 1.4 |
| Comparative Product 4 | 1.3 |
| Comparative Product 5 | 1.4 |
| Comparative Product 6 | 1.3 |

The cermet tools of Present Products and Comparative Products were polished vertically to the surfaces of the cermet tools, and from the cross-sections of the polished surfaces, the composition of each hard phase was identified by the SEM with an EDS. Further, an image of the cross-section of the internal region of the cermet tool enlarged at a magnification of 10000 with the SEM was taken. From the image thus taken, the area ratios A1, A2, and A3 of the respective hard phases were obtained using commercially available image analysis software. The results are shown in Table 7. Then, a cross-section to 500 μm inside in the depth direction from the surface of the cermet tool was observed with an SEM with an EDS to identify the composition of the binder phase. Further, the cross-section was chemically etched using aqua regia to observe the chemically etched cross-section with the SEM with an EDS. Then, from these two types of cross-section, an area ratio of the hard phase that was not chemically etched and an area ratio of binder phase that was chemically etched were measured. From the results, the proportion of volume % of the hard phase and volume % of the binder phase in the cermet tool were obtained. The results are shown in Table 8.

TABLE 7

| | Hard Phase | | | |
|---|---|---|---|---|
| | First Hard Phase | | | Second Hard Phase |
| | Composition | | A1 | Composition |
| Sample No. | Core Portion | Peripheral Portion | (area %) | Core Portion |
| Present Product 1 | (Ti, Nb, Mo) (C, N) | (Ti, Nb, Mo, W, Zr) (C, N) | 85 | (Ti, Nb, Mo, W) (C, N) |
| Present Product 2 | (Ti, Nb, Mo) (C, N) | (Ti, Nb, Mo, W, Zr) (C, N) | 80 | (Ti, Nb, Mo, W) (C, N) |
| Present Product 3 | (Ti, Nb, Mo) (C, N) | (Ti, Nb, Mo, W, Zr) (C, N) | 88 | (Ti, Nb, Mo, W) (C, N) |
| Present Product 4 | (Ti, Nb, Mo) (C, N) | (Ti, Nb, Mo, W, Zr) (C, N) | 84 | (Ti, Nb, Mo, W) (C, N) |
| Present Product 5 | (Ti, Nb, Mo) (C, N) | (Ti, Nb, Mo, W, Zr) (C, N) | 86 | (Ti, Nb, Mo, W) (C, N) |
| Present Product 6 | (Ti, Nb, Mo) (C, N) | (Ti, Nb, Mo, W, Zr) (C, N) | 91 | (Ti, Nb, Mo, W) (C, N) |
| Present Product 7 | (Ti, Nb, Mo) (C, N) | (Ti, Nb, Mo, W, Zr) (C, N) | 83 | (Ti, Nb, Mo, W) (C, N) |
| Present Product 8 | (Ti, Nb, Mo) (C, N) | (Ti, Nb, Mo, W, Zr) (C, N) | 84 | (Ti, Nb, Mo, W) (C, N) |
| Present Product 9 | (Ti, Nb, Mo) (C, N) | (Ti, Nb, Mo, W, Zr) (C, N) | 85 | (Ti, Nb, Mo, W) (C, N) |
| Present Product 10 | (Ti, Nb, Ta, Mo) (C, N) | (Ti, Nb, Ta, Mo, W, Zr) (C, N) | 82 | (Ti, Nb, Ta, Mo, W) (C, N) |
| Comparative Product 1 | (Ti, Nb, Mo) (C, N) | (Ti, Nb, Mo, W, Zr) (C, N) | 73 | (Ti, Nb, Mo, W) (C, N) |
| Comparative Product 2 | (Ti, Nb, Mo) (C, N) | (Ti, Nb, Mo, W, Zr) (C, N) | 66 | (Ti, Nb, Mo, W) (C, N) |
| Comparative Product 3 | Hard Phase having Core Portion of Ti (C, N) and Peripheral Portion of (Ti, Nb, Mo, W, Zr) (C, N): 78 area % | | | |
| | Hard Phase having Core Portion of (Ti, Nb, Mo, W) (C, N) and Peripheral Portion of (Ti, Nb, Mo, W, Zr) (C, N): 11 area % | | | |
| | Hard Phase of Ti (C, N): 11 area % | | | |

TABLE 7-continued

| Sample No. | Composition Peripheral Portion | Second Hard Phase A2 (area %) | Third Hard Phase Composition Single Phase Particle | A3 (area %) |
|---|---|---|---|---|
| Comparative Product 4 | (Ti, Nb, Mo) (C, N) | (Ti, Nb, Mo, W, Zr) (C, N) | 91 | (Ti, Nb, Mo, W) (C, N) |
| Comparative Product 5 | (Ti, Nb, Mo) (C, N) | (Ti, Nb, Mo, W, Zr) (C, N) | 70 | (Ti, Nb, Mo, W) (C, N) |
| Comparative Product 6 | (Ti, Nb, Mo) (C, N) | (Ti, Nb, Mo, W, Zr) (C, N) | 85 | (Ti, Nb, Mo, W) (C, N) |

| Sample No. | Second Hard Phase Composition Peripheral Portion | A2 (area %) | Third Hard Phase Composition Single Phase Particle | A3 (area %) |
|---|---|---|---|---|
| Present Product 1 | (Ti, Nb, Mo, W, Zr) (C, N) | 6 | (Ti, Nb, Mo) (C, N) | 9 |
| Present Product 2 | (Ti, Nb, Mo, W, Zr) (C, N) | 4 | (Ti, Nb, Mo) (C, N) | 16 |
| Present Product 3 | (Ti, Nb, Mo, W, Zr) (C, N) | 10 | (Ti, Nb, Mo) (C, N) | 2 |
| Present Product 4 | (Ti, Nb, Mo, W, Zr) (C, N) | 7 | (Ti, Nb, Mo) (C, N) | 9 |
| Present Product 5 | (Ti, Nb, Mo, W, Zr) (C, N) | 6 | (Ti, Nb, Mo) (C, N) | 8 |
| Present Product 6 | (Ti, Nb, Mo, W, Zr) (C, N) | 7 | (Ti, Nb, Mo) (C, N) | 2 |
| Present Product 7 | (Ti, Nb, Mo, W, Zr) (C, N) | 10 | (Ti, Nb, Mo) (C, N) | 7 |
| Present Product 8 | (Ti, Nb, Mo, W, Zr) (C, N) | 6 | (Ti, Nb, Mo) (C, N) | 10 |
| Present Product 9 | (Ti, Nb, Mo, W, Zr) (C, N) | 7 | (Ti, Nb, Mo) (C, N) | 8 |
| Present Product 10 | (Ti, Nb, Ta, Mo, W, Zr) (C, N) | 8 | (Ti, Nb, Ta, Mo) (C, N) | 10 |
| Comparative Product 1 | (Ti, Nb, Mo, W, Zr) (C, N) | 27 | — | 0 |
| Comparative Product 2 | (Ti, Nb, Mo, W, Zr) (C, N) | 34 | — | 0 |
| Comparative Product 3 | Hard Phase having Core Portion of Ti (C, N) and Peripheral Portion of (Ti, Nb, Mo, W, Zr) (C, N): 78 area % Hard Phase having Core Portion of (Ti, Nb, Mo, W) (C, N) and Peripheral Portion of (Ti, Nb, Mo, W, Zr) (C, N): 11 area % Hard Phase of Ti (C, N): 11 area % | | | |
| Comparative Product 4 | (Ti, Nb, Mo, W, Zr) (C, N) | 9 | — | 0 |
| Comparative Product 5 | (Ti, Nb, Mo, W, Zr) (C, N) | 30 | — | 0 |
| Comparative Product 6 | (Ti, Nb, Mo, W, Zr) (C, N) | 6 | (Ti, Nb, Mo) (C, N) | 9 |

TABLE 8

| Sample No. | Hard Phase (volume %) | Binder Phase Composition | (volume %) |
|---|---|---|---|
| Present Product 1 | 86.4 | (Ti, W) (Co, Ni) | 13.6 |
| Present Product 2 | 86.5 | (Ti, W) (Co, Ni) | 13.5 |
| Present Product 3 | 86.1 | (Ti, W) (Co, Ni) | 13.9 |
| Present Product 4 | 86.4 | (Ti, W) (Co, Ni) | 13.6 |
| Present Product 5 | 86.4 | (Ti, W) (Co, Ni) | 13.6 |
| Present Product 6 | 90.3 | (Ti, W) (Co, Ni) | 9.7 |
| Present Product 7 | 80.8 | (Ti, W) (Co, Ni) | 19.2 |
| Present Product 8 | 86.2 | (Ti, W) (Co, Ni) | 13.8 |
| Present Product 9 | 86.4 | (Ti, W) (Co, Ni) | 13.6 |
| Present Product 10 | 86.3 | (Ti, W) (Co, Ni) | 13.7 |
| Comparative Product 1 | 86.5 | (Ti, W) (Co, Ni) | 13.5 |
| Comparative Product 2 | 86.6 | (Ti, W) (Co, Ni) | 13.4 |
| Comparative Product 3 | 86.9 | (Ti, W, Nb) (Co, Ni) | 13.1 |
| Comparative Product 4 | 86.1 | (Ti, W) (Co, Ni) | 13.9 |
| Comparative Product 5 | 86.8 | (Ti, W) (Co, Ni) | 13.2 |
| Comparative Product 6 | 86.5 | (Ti, W) (Co, Ni) | 13.5 |

Using the samples thus obtained, Cutting Test 1, Cutting Test 2, and Cutting Test 3 were performed. Cutting Test 1 is a test for evaluation of fracture resistance, Cutting Test 2 for evaluation of wear resistance, and Cutting Test 3 for evaluation of a machined surface of a work piece material. The results of Cutting Tests are shown in Table 9.

[Cutting Test 1]
Processing mode: Milling,
Tool shape: SDKN1203,
Work piece material: SCM440,
Shape of work piece material: 200 mm×80 mm×200 mm (shape: board material with six holes of 30 mm size),
Cutting speed: 150 m/min,
Feed: 0.25 mm/tooth,
Depth of cut: 2.0 mm,
Coolant: Not used,
Point of evaluation: the tool life was defined as the time when the sample has a fracture, and the length of process until tool life was measured.

[Cutting Test 2]
Processing mode: Milling,
Tool shape: SDKN1203,
Work piece material: SCM440,
Shape of work piece material: 200 mm×80 mm×200 mm, Cutting speed: 250 m/min,
Feed: 0.15 mm/tooth,
Depth of cut: 2.0 mm,
Coolant: Not used, and
Point of evaluation: the tool life was defined as the time when the sample has a fracture or the sample has 0.3 mm of maximum flank wear width or the corner wear width, and the length of process until tool life was measured.

[Cutting Test 3]
Processing mode: Milling,
Tool shape: SDKN1203,
Work piece material: SS400,
Shape of work piece material: 150 mm×70 mm×150 mm,
Cutting speed: 150 m/min,
Feed: 0.15 mm/tooth,
Depth of cut: 0.3 mm,
Coolant: Not used, and
Point of evaluation: the arithmetic mean roughness Ra of the process surface of the work piece material was evaluated when the length of process was 5.0 m.

TABLE 9

| Sample No. | Cutting Test 1 Fracture Resistance Test Tool Life (m) | Cutting Test 2 Wear Resistance Test | | Cutting Test 3 Machined surface Evaluation Test Surface Roughness of Work Piece Material Ra (μm) |
|---|---|---|---|---|
| | | Tool Life (m) | Mode of Damage | |
| Present Product 1 | 3.5 | 12.8 | Flank Wear | 0.12 |
| Present Product 2 | 3.0 | 13.5 | Flank Wear | 0.11 |
| Present Product 3 | 3.8 | 11.4 | Flank Wear | 0.16 |
| Present Product 4 | 3.2 | 11.2 | Flank Wear | 0.13 |
| Present Product 5 | 3.3 | 12.4 | Flank Wear | 0.14 |
| Present Product 6 | 2.9 | 14.1 | Flank Wear | 0.11 |
| Present Product 7 | 4.2 | 9.8 | Flank Wear | 0.14 |
| Present Product 8 | 3.0 | 13.0 | Flank Wear | 0.12 |
| Present Product 9 | 3.6 | 9.5 | Flank Wear | 0.14 |
| Present Product 10 | 3.7 | 12.9 | Flank Wear | 0.12 |
| Comparative Product 1 | 2.1 | 9.2 | Flank Wear | 0.26 |
| Comparative Product 2 | 1.8 | 6.3 | Flank Wear | 0.17 |
| Comparative Product 3 | 0.7 | 5.8 | Fracture | 0.32 |
| Comparative Product 4 | 2.2 | 2.7 | Flank Wear | 0.37 |
| Comparative Product 5 | 0.8 | 11.2 | Flank Wear | 0.22 |
| Comparative Product 6 | 1.1 | 13.0 | Flank Wear | 0.19 |

The length of process in Cutting Test 1 was evaluated as "⊙" for 3 m or more, "O" for not less than 2 m and less than 3 m, "Δ" for not less than 1 m and less than 2 m, and "X" for less than 1 m. The length of process in Cutting Test 2 was evaluated as "⊙" for 10 m or more, "O" for not less than 7 m and less than 10 m, "Δ" for not less than 3 m and less than 7 m, and "X" for less than 3 m. The arithmetic mean roughness Ra of the process surface of the work piece material in Cutting Test 3 was evaluated as "⊙" for less than 0.15 μm, "O" for not less than 0.15 μm and less than 0.25 μm, "Δ" for not less than 0.25 μm and less than 0.35 μm, and "X" for 0.35 μm or more. The evaluation is in the order of (excellent) "⊙">"O">"Δ">"X" (poor), and "⊙" and "O" show better cutting performances. The results of evaluation thus obtained are shown in Table 10.

TABLE 10

| Sample No. | Cutting Test 1 | Cutting Test 2 | Cutting Test 3 |
|---|---|---|---|
| Present Product 1 | ⊙ | ⊙ | ⊙ |
| Present Product 2 | ⊙ | ⊙ | ⊙ |
| Present Product 3 | ⊙ | ⊙ | O |
| Present Product 4 | ⊙ | ⊙ | ⊙ |
| Present Product 5 | ⊙ | ⊙ | ⊙ |
| Present Product 6 | O | ⊙ | ⊙ |
| Present Product 7 | ⊙ | O | ⊙ |
| Present Product 8 | ⊙ | ⊙ | ⊙ |
| Present Product 9 | ⊙ | O | ⊙ |
| Present Product 10 | ⊙ | ⊙ | ⊙ |
| Comparative Product 1 | O | O | Δ |
| Comparative Product 2 | Δ | Δ | O |
| Comparative Product 3 | X | Δ | Δ |
| Comparative Product 4 | O | X | X |
| Comparative Product 5 | X | ⊙ | O |
| Comparative Product 6 | Δ | ⊙ | O |

All of the evaluations of Present Products were "⊙" or "O", and it is understood that they were excellent in wear resistance and fracture resistance and were capable of reducing the machined surface roughness. In contrast, the evaluations of Comparative Products have "Δ" or "X", and it is understood that they did not satisfy at least one of the performances among wear resistance, fracture resistance, and machined surface roughness.

Example 2

The surfaces of the cermet tools of Present Products 1 to 10 in Example 1 were coated using a PVD apparatus. Present Products 1 to 10 and Comparative Products 1 to 6 were coated with a TiAlN layer having an average layer thickness of 2.5 μm on the surfaces and they are defined as Present Products 11 to 20 and Comparative Products 7 to 12. The cermet tool of Present Product 1 was coated with a Ti(C, N) layer having an average layer thickness of 2.5 μm on the surface and it is defined as Present Product 21. In addition, the cermet tool of Present Product 1 was coated with an alternate lamination in which TiAlN with 2 nm per layer and TiAlNbWN with 3 nm per layer were alternately laminated 500 layers each and it is define as Present Product 22. Present Products 11 to 22 and Comparative Products 7 to 12 were subjected to Cutting Tests 1, 2, and 3, which are the same as the Tests in Example 1. The results are shown in Table 11.

TABLE 11

| Sample No. | Cutting Test 1 Fracture Resistance Test Tool Life (m) | Cutting Test 2 Wear Resistance Test | | Cutting Test 3 Machined surface Evaluation Test Surface Roughness of Work Piece Material Ra (μm) |
|---|---|---|---|---|
| | | Tool Life (m) | Mode of Damage | |
| Present Product 11 | 3.1 | 17.4 | Flank Wear | 0.19 |
| Present Product 12 | 2.8 | 19.0 | Flank Wear | 0.18 |

TABLE 11-continued

| Sample No. | Cutting Test 1 Fracture Resistance Test Tool Life (m) | Cutting Test 2 Wear Resistance Test Tool Life (m) | Cutting Test 2 Wear Resistance Test Mode of Damage | Cutting Test 3 Machined surface Evaluation Test Surface Roughness of Work Piece Material Ra (μm) |
|---|---|---|---|---|
| Present Product 13 | 3.2 | 13.5 | Flank Wear | 0.24 |
| Present Product 14 | 2.5 | 13.5 | Flank Wear | 0.17 |
| Present Product 15 | 2.8 | 15.4 | Flank Wear | 0.19 |
| Present Product 16 | 2.2 | 16.8 | Flank Wear | 0.14 |
| Present Product 17 | 3.1 | 11.1 | Flank Wear | 0.15 |
| Present Product 18 | 2.5 | 14.2 | Flank Wear | 0.17 |
| Present Product 19 | 3.1 | 10.8 | Flank Wear | 0.21 |
| Present Product 20 | 3.3 | 17.6 | Flank Wear | 0.19 |
| Present Product 21 | 2.8 | 18.2 | Flank Wear | 0.19 |
| Present Product 22 | 3.3 | 19.8 | Flank Wear | 0.15 |
| Comparative Product 7 | 1.4 | 11.2 | Flank Wear | 0.33 |
| Comparative Product 8 | 0.9 | 8.7 | Flank Wear | 0.25 |
| Comparative Product 9 | 0.3 | 7.4 | Fracture | 0.42 |
| Comparative Product 10 | 1.2 | 3.3 | Flank Wear | 0.47 |
| Comparative Product 11 | 0.2 | 13.3 | Flank Wear | 0.36 |
| Comparative Product 12 | 0.1 | 15.0 | Flank Wear | 0.55 |

The length of process in Cutting Test 1 was evaluated as "⊙" for 3 m or more, "O" for not less than 2 m and less than 3 m, "Δ" for not less than 1 m and less than 2 m, and "X" for less than 1 m. The length of process in Cutting Test 2 was evaluated as "⊙" for 10 m or more, "O" for not less than 7 m and less than 10 m, "Δ" for not less than 3 m and less than 7 m, and "X" for less than 3 m. The arithmetic mean roughness Ra of the process surface of the work piece material in Cutting Test 3 was evaluated as "⊙" for less than 0.15 μm, "O" for not less than 0.15 μm and less than 0.25 μm, "Δ" for not less than 0.25 μm and less than 0.35 μm, and "X" for 0.35 μm or more. The evaluation is in the order of (excellent) "⊙">"O">"Δ">"X" (poor), and "⊙" and "O" show better cutting performances. The results of evaluation thus obtained are shown in Table 12.

TABLE 12

| Sample No. | Cutting Test 1 | Cutting Test 2 | Cutting Test 3 |
|---|---|---|---|
| Present Product 11 | ⊙ | ⊙ | O |
| Present Product 12 | O | ⊙ | O |
| Present Product 13 | ⊙ | ⊙ | O |
| Present Product 14 | O | ⊙ | O |
| Present Product 15 | O | ⊙ | O |
| Present Product 16 | O | ⊙ | ⊙ |
| Present Product 17 | ⊙ | ⊙ | O |
| Present Product 18 | O | ⊙ | O |
| Present Product 19 | ⊙ | ⊙ | O |
| Present Product 20 | ⊙ | ⊙ | O |
| Present Product 21 | O | ⊙ | O |
| Present Product 22 | ⊙ | ⊙ | O |
| Comparative Product 7 | Δ | ⊙ | Δ |
| Comparative Product 8 | X | O | Δ |
| Comparative Product 9 | X | O | X |
| Comparative Product 10 | Δ | Δ | X |
| Comparative Product 11 | X | ⊙ | X |
| Comparative Product 12 | X | ⊙ | X |

All Present Products of the evaluations of Present Products were "⊙" or "O", and it is understood that they were excellent in wear resistance and fracture resistance and were capable of reducing machined surface roughness. In contrast, the evaluations of Comparative Products have "Δ" or "X", and it is understood that they did not satisfy at least one of the performances among wear resistance, fracture resistance, and machined surface roughness. In the wear resistance test, the tool life of Present Products without coating a coating layer was 9.5 m or more, whereas the tool life of Present Products with coating a coating layer was 10.8 m or more. Therefore, it is understood that the tool life became longer. Present Products 11 to 22 with coating a coating layer had smaller surface roughness compared to that of Comparative Products 7 to 12 and enabled that life time in wear resistance was longer than that of Present Products 1 to 10 without coating a coating layer.

INDUSTRIAL APPLICABILITY

The coated cutting tool of the present invention is capable of reducing machined surface roughness of a work piece material and is excellent in fracture resistance and chipping resistance without reducing wear resistance. Therefore, the tool is capable of extending tool life more than conventional ones, so that the coated cutting tool of the present invention is highly industrially applicable.

What is claimed is:
1. A cermet tool, comprising:
   not less than 75 volume % and not more than 95 volume % of a hard phase; and
   not less than 5 volume % and not more than 25 volume % of a binder phase, wherein
   the hard phase is composed of
   (a) a first hard phase with a core-rim structure composed of a core portion with a composite carbonitride phase of Ti, Nb, and Mo and a peripheral portion with a composite carbonitride phase of Ti, Nb, Mo, W, and Zr, hereinafter, referred to as (Ti, Nb, Mo, W, Zr) (C, N), or a composite carbonitride phase of Ti, Nb, Mo, and W, hereinafter, referred to as (Ti, Nb, Mo, W)(C, N),
   (b) a second hard phase with a core-rim structure composed of both a core portion and a peripheral portion with the (Ti, Nb, Mo, W, Zr) (C, N) phase or the (Ti, Nb, Mo, W) (C, N) phase, and
   (c) a third hard phase composed of a composite carbonitride phase of Ti, Nb, and Mo,
   the binder phase is composed of an element having at least one selected from the group consisting of Co, Ni, and Fe as a main component,
   when a maximum content of a concentration of the Nb element in a surface region that is within a range from a surface of the cermet tool to a depth of 300 μm is Nbs and an internal content of a concentration of the Nb element in an internal region that is deeper inside from the surface region is Nbi, Nbs/Nbi is not less than 0.8 and not more than 1.2, when a maximum content of a concentration of the W element in the surface region is Ws and an internal content of a concentration of the W element in the internal region is Wi, Ws/Wi is not less than 1.0 and not more than 1.5, and, in the hard phase, in a cross section of the internal region of the cermet tool, when an area ratio of the first hard phase is A1, an area ratio of the second hard phase is A2, an area ratio of the third hard phase is A3, and an entirety of the area of the hard phase is 100% of the area, A1 is not less than 75% of the area and not more than 95% of the area, A2 is not less than 4% of the area and not more than 24% of the area, and A3 is not less than 1% of the area and not more than 16% of the area.

2. The cermet tool according to claim 1, wherein, when Vickers hardness in the surface region is Hs and Vickers hardness in the internal region is Hi, Hs/Hi is not less than 1.1 and not more than 1.3.

3. The cermet tool according to claim 1, wherein, when an area ratio of the core portion in the first hard phase in the surface region is C1s and an area ratio of the core portion in the first hard phase in the internal region is C1i, C1s/C1i is not less than 0.3 and not more than 0.9.

4. The cermet tool according to claim 1, wherein, when an average particle size of the hard phase in the surface region is ds and an average particle size of the hard phase in the internal region is di, ds/di is not less than 1.0 and not more than 2.0.

5. The cermet tool according to claim 1, wherein an average particle size of the hard phase is not less than 1.0 μm and not more than 3.0 μm.

6. The cermet tool according to claim 1, further comprising Ta in the hard phase.

7. A coated cermet tool, comprising:
the cermet tool according to claim 1; and
a coating layer formed on a surface of the cermet tool.

8. The cermet tool according to claim 1,
the surface region of the tool is considered to be within 300 μm of the tool's outer surface; and
the internal region of the tool is considered to be deeper than 300 μm of the tool's outer surface.

9. A cermet tool, comprising:
not less than 75 volume % and not more than 95 volume % of a hard phase; and
not less than 5 volume % and not more than 25 volume % of a binder phase, wherein
the hard phase is composed of
  (a) a first hard phase with a core-rim structure composed of a core portion with a composite carbonitride phase of Ti, Nb, and Mo and a peripheral portion with a composite carbonitride phase of Ti, Nb, Mo, W, and Zr, hereinafter, referred to as (Ti, Nb, Mo, W, Zr)(C, N), or a composite carbonitride phase of Ti, Nb, Mo, and W, hereinafter, referred to as (Ti, Nb, Mo, W) (C, N),
  (b) a second hard phase with a core-rim structure composed of both a core portion and a peripheral portion with the (Ti, Nb, Mo, W, Zr) (C, N) phase or the (Ti, Nb, Mo, W) (C, N) phase, and
  (c) a third hard phase composed of a composite carbonitride phase of Ti, Nb, and Mo,
the binder phase is composed of an element having at least one selected from the group consisting of Co and Ni as a main component, a surface region of the tool is considered to be within 300 μm of the tool's outer surface;
an internal region of the tool is considered to be deeper than 300 μm of the tool's outer surface;
a ratio of Nbs/Nbi is from 0.8 to 1.2, where Nbs is a maximum Nb amount in the surface region and Nbi is an internal Nb amount in the internal region;
a ratio of Ws/Wi is from 1.0 to 1.5, where Ws is a maximum W amount in the surface region and Wi is an internal W amount in the internal region; and
in the hard phase, in a cross section of the internal region of the cermet tool, when an area ratio of the first hard phase is A1, an area ratio of the second hard phase is A2, an area ratio of the third hard phase is A3, and an entirety of the area of the hard phase is 100% of the area, A1 is not less than 75% of the area and not more than 95% of the area, A2 is not less than 4% of the area and not more than 24% of the area, and A3 is not less than 1% of the area and not more than 16% of the area.

10. The cermet tool according to claim 9, wherein:
a ratio Hs/Hi is not less than 1.1 and not more than 1.3, Hs being Vickers hardness in the surface region and Hi being Vickers hardness in the internal region.

11. The cermet tool according to claim 10, wherein:
a ratio C1s/C1i is not less than 0.3 and not more than 0.9, C1s being an area ratio of the core portion in the first hard phase in the surface region and C1i being an area ratio of the core portion in the first hard phase in the internal region.

12. The cermet tool according to claim 11, wherein:
a ratio ds/di is not less than 1.0 and not more than 2.0, ds being an average particle size of the hard phase in the surface region and di being an average particle size of the hard phase in the internal region.

13. The cermet tool according to claim 12, wherein:
an average particle size of the hard phase is not less than 1.0 μm and not more than 3.0 μm.

14. The cermet tool according to claim 13, further comprising Ta in the hard phase.

15. The cermet tool according to claim 9, wherein:
a ratio Hs/Hi is not less than 1.1 and not more than 1.3, Hs being Vickers hardness in the surface region and Hi being Vickers hardness in the internal region; and
a ratio ds/di is not less than 1.0 and not more than 2.0, ds being an average particle size of the hard phase in the surface region and di being an average particle size of the hard phase in the internal region.

16. The cermet tool according to claim 15, wherein:
an average particle size of the hard phase is not less than 1.0 μm and not more than 3.0 μm.

17. The cermet tool according to claim 16, further comprising Ta in the hard phase.

18. The cermet tool according to claim 9, wherein:
a ratio C1s/C1i is not less than 0.3 and not more than 0.9, C1s being an area ratio of the core portion in the first hard phase in the surface region and C1i being an area ratio of the core portion in the first hard phase in the internal region; and
a ratio ds/di is not less than 1.0 and not more than 2.0, ds being an average particle size of the hard phase in the surface region and di being an average particle size of the hard phase in the internal region.

19. The cermet tool according to claim 18, wherein:
an average particle size of the hard phase is not less than 1.0 μm and not more than 3.0 μm.

20. The cermet tool according to claim 19, further comprising Ta in the hard phase.

* * * * *